United States Patent [19]
Abramson et al.

[11] Patent Number: 6,131,135
[45] Date of Patent: Oct. 10, 2000

[54] ARBITRATION METHOD FOR A SYSTEM WITH TWO USB HOST CONTROLLERS

[75] Inventors: Darren L. Abramson, Folsom; Karthi R. Vadivelu, Fair Oaks, both of Calif.

[73] Assignee: Intel Corporation, Santa Clara, Calif.

[21] Appl. No.: 09/107,706

[22] Filed: Jun. 30, 1998

[51] Int. Cl.[7] .................................................. G06F 13/38
[52] U.S. Cl. ............................ 710/126; 710/1; 710/62; 710/63; 710/129; 710/240
[58] Field of Search ............................ 710/1, 126, 129, 710/62, 63, 240, 244

[56] References Cited

U.S. PATENT DOCUMENTS 5,970,220  10/1999  Bolash et al. ........................... 395/114

*Primary Examiner*—Ario Etienne
*Attorney, Agent, or Firm*—Blakely, Sokoloff, Taylor & Zafman LLP

[57] ABSTRACT

A method and apparatus for coupling multiple USB host controllers to a high speed bus is described. The apparatus uses a USB arbiter to couple multiple USB host controllers to the high speed bus.

30 Claims, 2 Drawing Sheets

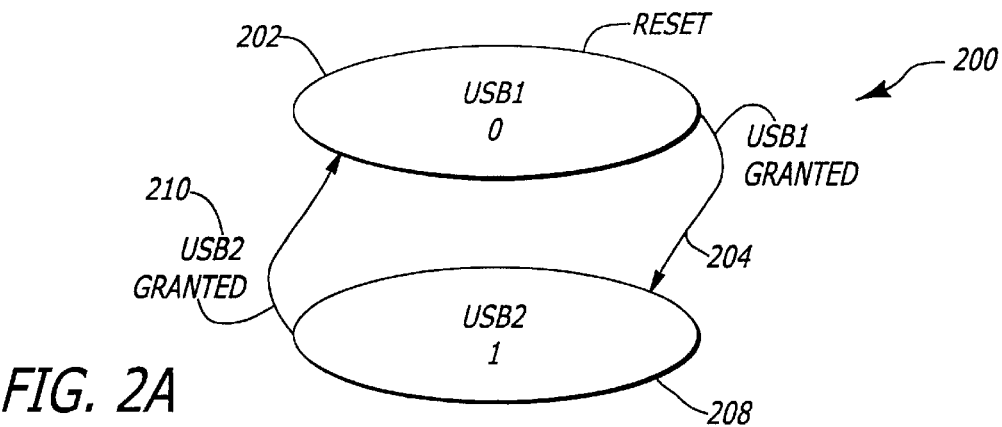
*FIG. 2A*
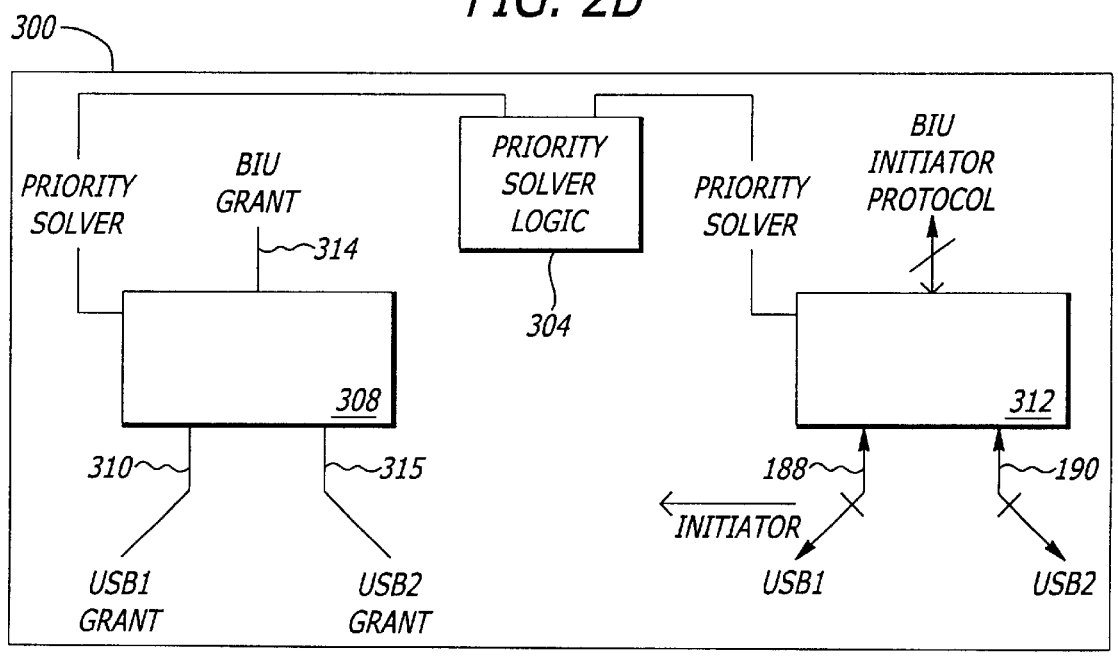

ARBITRATION METHOD FOR A SYSTEM WITH TWO USB HOST CONTROLLERS

BACKGROUND OF THE INVENTION

1. Field of the Invention

The present invention relates generally to the field of computer systems, specifically, to a method and apparatus for connecting host controllers to a high-speed bus.

2. Background

Low-speed serial buses have been popular in computer systems because of their low cost. These serial busses couple serial type devices which typically do not have significant bandwidth requirements. An example of a low-speed serial bus is the universal serial "USB" bus. The USB bus supports "USB devices" such as keyboards, joy sticks, pointing devices, mice and audio speakers. Typically, these USB devices do not have significant bandwidth requirements. A USB host controller connects the USB devices to a bus interface unit. The bus interface unit is typically connected to a high speed interconnect bus. In order to minimize the number of USB host controllers needed, a hub or a plurality of hubs may be used to couple several USB devices to each USB host controller. Each hub provides additional ports to the USB host controller.

Each USB host controller has a bandwidth or maximum transfer rate of approximately 12 megabits per second (Mb/s). The maximum transfer rate is set by "Universal Serial Bus Specification 1.0", Jan. 15, 1996, by Compaq, Digital Equipment Corporation, IBM PC Company, Intel Corporation, Microsoft Corporation, NEC and Northern Telecom. When more than one USB device is coupled to a USB host controller, typically through hubs, the combined output of all the coupled USB devices cannot exceed 12 Mb/s. Thus, each individual USB device has a maximum transfer rate of less than 12 Mb/s.

When the devices connected to the USB host controller have very low-bandwidth requirements, the 12 Mb/s limitation total for all devices coupled to the USB host controller does not present a problem. However, when low-cost imaging devices which transfer significant amounts of data are coupled to the USB host controller, the imaging devices use a substantial portion of the 12 Mb/s bandwidth of the USB host controller. One example of such a low-cost imaging device is a Pro Share® camera from Intel Corporation of Santa Clara, Calif. Coupling two or more imaging such devices to the USB host controller can result in data loss due to insufficient bandwidth in isochronous systems and data transfer delays in non-isochronous systems due to the 12 Mb/s limitation.

Thus, an improved method of coupling multiple USB devices to a high-speed interconnect bus is needed.

SUMMARY OF THE INVENTION

The invention describes a circuit including a first USB host controller and a second USB host controller. A USB arbiter couples the first USB host controller and the second USB host controller to a bus. The arbiter arbitrates between grant request signals from the first USB host controller and the second USB host controller.

BRIEF DESCRIPTION OF THE DRAWINGS

FIGS. 2A–2B illustrates one embodiment of a priority state machine to determine the priority of the USB host controller coupled to the arbiter.

FIG. 3 illustrates one embodiment of an arbiter for use in the described invention.

DETAILED DESCRIPTION OF THE INVENTION

Figure 1:
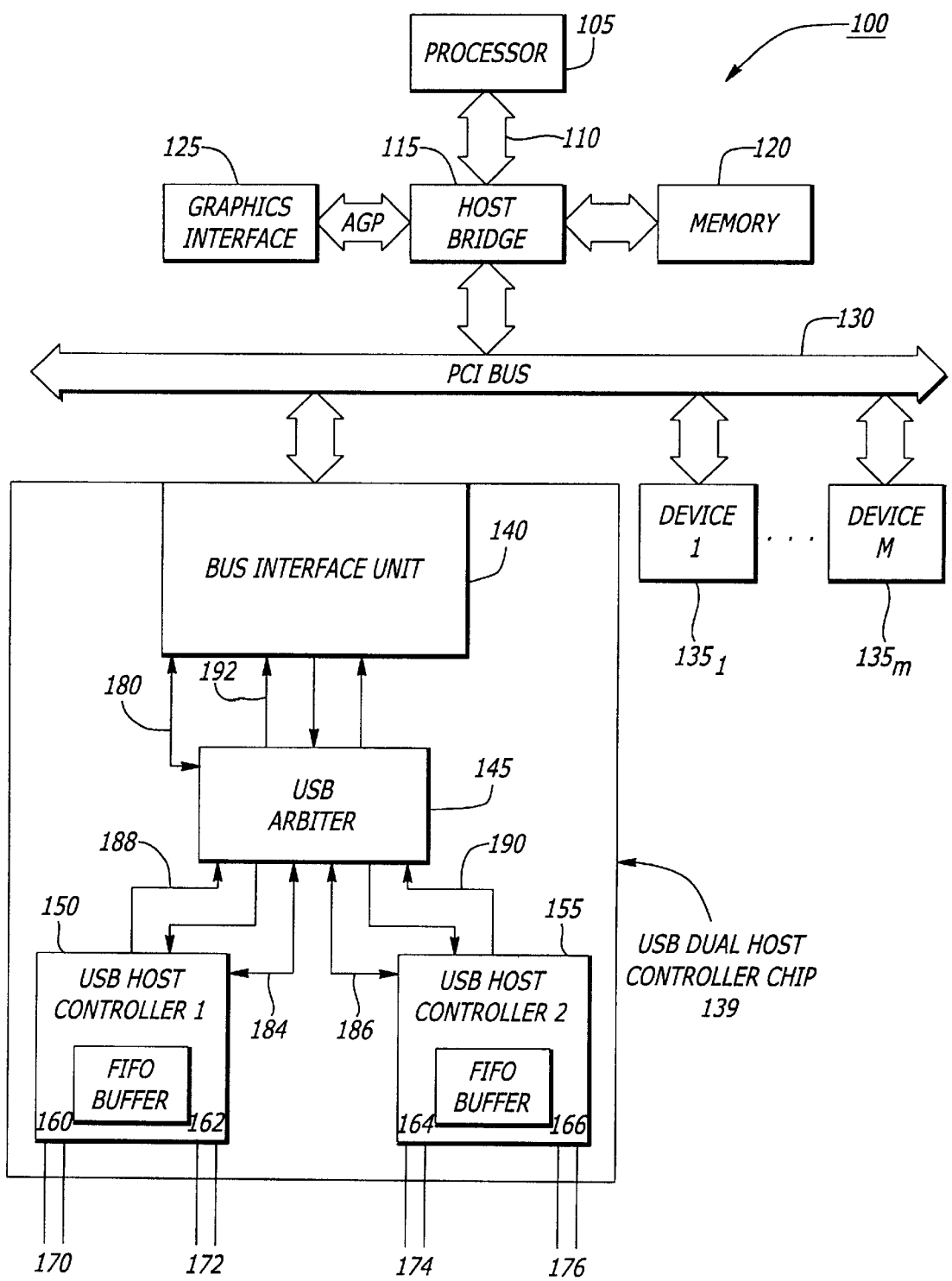
FIG. 1 illustrates one embodiment of a system for coupling USB devices to a high speed bus.

In the following description, a system for connecting a plurality of USB devices to a high-speed bus will be described. The system allows the total data transfer rate from the plurality of USB devices to exceed 12 mb/s. Herein, numerous details set forth in order to provide a thorough understanding of the present invention. However, it will be apparent to one skilled in the art that these specific details are not required in order to practice the present invention. As discussed here, a "computer system" is a product including circuitry capable of processing data.

Referring to FIG. 1, computer system 100 includes a processor 105 coupled to a host bridge 115 by way of host bus 110. Processor 105 may be any type of processor such as a microcontroller, or a general purpose microprocessor. In alternative embodiments, the processor may be replaced by firmware implemented to perform as a state machine. In the embodiment shown, host bridge 115 is a Peripheral Component Interconnect (PCI) bridge, although other bridges may be used in lieu thereof. The host bridge 115 couples together system memory 120 (e.g., dynamic random access memory "DRAM", static RAM "SRAM", etc.), a high-speed interconnect bus (e.g., a PCI bus) 130 and a graphics interface 125. In one embodiment, the high-speed interconnect bus is a multiplexed bus which carries both address information and data information. The host bridge 115 bridges processor transactions to either system memory 120, PCI bus 130 or graphics interface 125. The host bridge 115 also transfers signals from graphics interface 125 or PCI bus 130 to system memory 120. In one embodiment, host bridge 115 includes a PCI arbiter which arbitrates data flow from devices coupled to PCI bus 130. However, it is contemplated that another agent may contain the PCI arbiter.

PCI bus 130 provides a communication path between the processor 105 or system memory 120 and one or more peripheral devices $135_1$ to 135M, where "M" is a positive whole number. Examples of a peripheral device include a network interface card, a SCSI controller card, and the like. The PCI bus 130 further provides a communication path between the processor 105 or system memory 120 and a dual Universal Serial Bus (USB) host controller chip 139 which includes a bus interface unit (BIU) 140. In one embodiment, USB host controller chip 139 includes BIU 140, USB arbiter 145, USB host controller 150, 155 on a single chip of silicon. Integrating all these devices on a single silicon chip minimizes costs.

The BIU 140 facilitates transfers of data between PCI bus 130 and a USB host controller 150 via a USB arbiter 145. The BIU 140 requests access to PCI bus 130 when USB arbiter 145 forwards a bus access request from a selected USB host controller 150, 155. An external arbiter, such as a PCI arbiter in host bridge 115, independently determines when BIU 140 may access PCI bus 130 and when other peripherals $135_1$ to $135_M$ are granted access to PCI bus 130. In some embodiments, additional components and/or peripherals may be directly coupled to the BIU 140 and a BIU arbiter used to further control access to PCI bus 130. When an external arbiter such as the PCI arbiter in host bridge 115 grants BIU 140 access to PCI bus 130, USB arbiter 145 grant one access request from USB host controllers 150, 155 to forward to PCI bus 130.

In the illustrated embodiment, each USB host controller 150, 155 has several USB ports 160, 162, 164, 166 for coupling USB devices 170, 172, 174, 176 to the controllers. Examples of typical USB devices which may be connected to each USB port 160, 162, 164, 166 include, but are not limited to, computer keyboards, scanners, joysticks, audio microphones, and imaging cameras. Some of these devices, such as a keyboard and joystick are low-bandwidth devices. Other devices, such as an imaging camera and scanner are high-bandwidth devices. A high-bandwidth device is defined as a device which requires over half of the 12 megabit per second bandwidth of the USB host controller to avoid degradation in performance. Coupling two high-bandwidth devices to a single USB host controller 150, 155 may result in poor performance because each USB host controller can only handle 12 megabits of data transfer per second. Thus, in order to prevent overload of the USB host controller, typically a high-bandwidth device and a low-bandwidth device are coupled to each USB host controller. Alternatively, two or more low-bandwidth devices may be coupled to each USB host controller.

In the illustrated embodiment, USB host controllers 150, 155 perform the initiator protocols necessary to access bus interface unit 140 and PCI bus 130. Each USB host controller, such as host controllers 150, 155 are commercially available and can be ordered as part No. 82371AB from Intel Corporation of Santa Clara, Calif. USB host controllers are also described in *Universal Serial Bus System Architecture*, by Don Anderson of Mindshare, Inc. ©1997, published by Addison-Wesley Developers Press with ISBN No. D-201-46137-4.

In one embodiment of the invention, USB arbiter 145 receives a target protocol along lines 180, from bus interface unit 140. USB arbiter 145 communicates the target protocols along lines 184, 186 to the first and second USB host controllers 150, 155. The target protocols accesses register sets within USB host controllers 150, 155. Examples of typical registers include a register that limits the time a host controller can spend on the bus as an initiator, control registers which direct the host controller to begin and halt processing instructions, and status registers which provide controller states.

Initiator lines 188 and 190 communicate information, such as addresses, data, control or any combination thereof to facilitate data transfer to USB host controller 150, 155. Control information may include write data, handshake protocol and other information used to facilitate movement of data to and from the USB host controller. After configuration of the USB host controllers, bits in the USB host controller input/output space (I/O space) are set. The bits set in the USB host controller initiate execution of an instruction set allowing USB host controllers 150, 155 to generate requests through an initiator mechanism. The USB arbiter 145 receives the request and selects an initiator protocol and target protocol from the protocols submitted by USB host controllers 150, 155. The arbiter 145 transmits the selected initiator and target protocols to the BIU 140 along line 192 and line 180.

USB arbiter 145 grants a selected USB host controller 150, 155 access to PCI bus 130. In one embodiment of the invention, a priority solver logic circuit determines which USB host controller had the least recent access to the bus when contention occurs. Contention occurs when two or more USB host controllers request access to the bus within a specified time period such that when PCI arbiter grants the USB arbiter 145 access to the bus 130, at least two USB host controller request for bus access are pending.

FIG. 2A illustrates an example of a priority solver state machine 200. The output of the priority state machine of FIG. 2A is illustrated in FIG. 2B. In FIG. 2A priority solver state machine 200 determines whether USB arbiter 145 grants an access to first USB host controller 150 or second USB host controller 155. In a first state 202, the priority solver assigns a higher priority to first USB host controller 150 such that when a contention occurs, first USB host controller 150 will receive the grant. After first USB host controller 150 is granted access to the bus, state machine 200 transitions along transition path 204 to second state 208. USB priority solver state machine 200 remains in second state 208 until USB arbiter 145 grants second USB host controller 155 access to PCI bus 130. After second USB host controller 155 receives access to PCI bus 130, priority solver state machine 200 transitions along transition path 210 to initial state 202 wherein the first USB host controller 150 again has priority.

FIG. 2B illustrates how the USB arbiter which receives signals from the USB state machine of FIG. 2A prioritizes bus access requests. First column 216 indicates requests by first USB host controller 150 to access PCI bus 130. Column 220 indicates requests from second USB host controller 155 to access PCI bus 130. Column 224 indicates the output of priority solver state machine 200 of FIG. 2A. The state machine output determines which USB host controller has priority. Column 228 indicates the USB host controller which is granted access to PCI bus 130.

In row 230 and row 232, when neither first USB host controller 150 nor second USB host controller 155 requests access to PCI bus 130, neither USB host controller is granted access in column 228 and the output of the priority solver state machine 200 given in column 224 is unimportant. In row 234 and row 236, when only the second USB host controller requests access, the second USB host controller is granted access to PCI bus 130 in column 228. In row 238 and 240, when only first USB host controller 150 requests access and second USB host controller 155 does not request access, the USB arbiter 145 grants access to the first USB host controller in column 228. Only when a contention occurs, when two or more USB host controllers both request access to PCI bus 130, does the priority solver 200 output determine which USB host controller is granted access. Contention occurs in row 242 and row 244. When contention occurs, the output of priority solver state machine 200 illustrated in column 224 determines which USB host controller is granted access in column 228. The output of priority solver state machine 200 can be generated by implementing logic circuitry that is well-known in the art.

FIG. 3 illustrates one embodiment of implementing a USB arbiter 300 such as USB arbiter 145 of FIG. 1. USB arbiter 300 includes a priority solver logic circuit 304 which is coupled to the select input of two multiplexer-demultiplexer combinations 308, 312. A multiplexer-demultiplexer combination is defined as a device which can serve as a multiplexer in a first direction and a demultiplexer in a second direction. In the illustrated embodiment, first multiplexer-demultiplexer combination 308 transfers grant request signals while second multiplexer-demultiplexer combination 312 transfers initiator protocols.

First multiplexer-demultiplexer combination 308 receives grant request signals (a request signal requesting a grant) from first USB host controller 150 of FIG. 1. (The request signal of the first USB host controller corresponds to column 216 of FIG. 2B). The second input line 315 receives request signals from the second USB host controller (corresponding to column 220 of FIG. 2B). The output line 314 of first multiplexer-demultiplexer combination 308 provides the grant signal from the arbiter 145 to the bus interface unit 140 of FIG. 1. In order for data transfer to occur, all arbiters must grant access including USB arbiter 300, bus interface unit 140 and PCI arbiter in host bridge 115.

Second multiplexer-demultiplexer combination 312 in USB arbiter 300 selects the initiator protocol output to the bus interface unit. The first USB host controller 150 of FIG. 1 outputs an initiator handshake signal to second multiplexer-demultiplexer combination 312 along input or initiator line 188. Second USB host controller 155 of FIG. 1 transfers a second initiator signal to second multiplexer-demultiplexer combination 312 along second initiator lines 190. The output of priority solver 304 is coupled to the select input of second multiplexer-demultiplexer combination 312. The output of priority solver 304 determines the appropriate initiator protocol signal transmitted to BIU 140 of FIG. 1.

The preceding implementation of the invention has been described using a single arbiter 145 coupling two USB host controllers 150, 155 to a high speed bus. However, it should be clear to one of ordinary skill in the art that an arbiter can be configured to control two or more USB host controllers. Thus, a single arbiter 145 could handle three or more USB host controllers. In such embodiments, the two multiplexer-demultiplexer combinations 308, 312 of FIG. 3 would have additional inputs allowing a three to one or other multiplexer-demultiplexer combination. In one embodiment of the invention, the priority solver takes into account additional USB host controllers and determines which USB host controller had the least recent access. Other arbitration schemes are also possible. For example, a rotating arbitration selects subsequent USB host controllers in a predetermined sequence. A fixed arbitration scheme maintains a hierarchy of USB host controllers and always grants priority to higher priority USB host controllers when a contention occurs.

While certain exemplary embodiments have been described and shown in the accompanying drawings, it is to be understood that such embodiments are newly-illustrated and not restrictive on the broad invention and this invention not be limited to the specific constructions and arrangements shown and described, since other modifications may occur to those ordinarily skilled in the art.

What is claimed is:

1. For establishing communications with a bus, a circuit comprising:
   a first universal serial bus (USB) host controller;
   a second USB host controller; and
   a USB arbiter to couple the first and second USB host controllers to the bus, the USB arbiter to (i) support a total data flow of more than twelve megabits with the bus being approximately equal to a sum of a first data flow between the first universal serial bus host controller and the universal serial bus arbiter and a second data flow between the second universal serial bus host controller and the universal serial bus arbiter, and (ii) arbitrate between grant request signals from the first USB host controller and the second USB host controller.

2. The circuit of claim 1 further comprising:
   a bus interface unit which grants requests to the bus based upon request from the USB arbiter.

3. The circuit of claim 2 wherein the bus interface unit includes a second arbiter to control access to the bus.

4. The circuit of claim 1 wherein the bus is a peripheral component interconnect (PCI) bus.

5. The circuit of claim 1 wherein the first USB host controller includes a first-in/first-out buffer to temporarily store data from a USB device coupled to a first USB port of the first USB host controller.

6. The circuit of claim 5 wherein the first USB host controller includes a second USB port to couple to an additional USB device.

7. The circuit of claim 1 wherein the USB arbiter includes a priority solver logic circuit to determine whether the first USB host controller or the second USB host controller had the least recent access to the bus.

8. The circuit of claim 1 wherein the USB arbiter uses rotating arbitration to select whether the first USB host controller or the second USB host controller receives access.

9. The circuit of claim 1 wherein the USB arbiter uses fixed arbitration to select whether the first USB host controller or the second USB host controller receives access.

10. The circuit of claim 1 wherein the USB arbiter is configured to select one initiator handshake signal to generate a selected initiator handshake signal from a plurality of initiator handshake signals from the first USB host controller and the second USB host controller.

11. The circuit of claim 10 wherein the selected initiator handshake signal is output to a bus interface unit.

12. The circuit of claim 1 wherein the first USB host controller, the second USB host controller and the USB arbiter are fabricated on a single silicon chip.

13. The circuit of claim 1 wherein the bus is a multiplexed bus.

14. The circuit of claim 1 further comprising:
   a plurality of USB devices including a first USB device coupled to a port of the first USB host controller and a second USB device coupled to a port of the second USB host controller.

15. A method of transferring data between a plurality of Universal Serial Bus (USB) devices and a bus comprising the operations of:
   determining using a priority solver state machine of a USB arbiter whether a first USB host controller or a second USB host controller has priority;
   granting access to the bus to one of the first and second USB host controllers which has priority; and
   arbitrating between a signal from the USB arbiter and other peripherals on the bus using a Peripheral Component Interconnect (PCI) arbiter.

16. The method of claim 15 wherein the output of the priority solver state machine is input into a select line of a demultiplexer.

17. The method of claim 15 further comprising the operation of:
   forwarding an initiator protocol from the USB host controller which has priority to a bus interface unit.

18. The method of claim 15 wherein the determining operation grants priority to the USB host controller which least recently had access to the bus.

19. A USB arbiter for arbitrating among a plurality of USB host controllers comprising:
   a priority solver logic circuit for determining a USB host controller in the plurality of USB host controllers which least recently had access to a bus; and
   a selector circuit for granting an access request from the USB host controller selected by the priority solver when a contention occurs, the selector circuit being a demultiplexor including a select line coupled to an output of the priority solver logic and at least one input line of the demultiplexor configured to receive initiator signals from the plurality of USB host controllers.

20. The USB arbiter of claim 19 wherein the selector circuit is a multiplexer-demultiplexer combination.

21. Implemented to establish communications with a bus, a system comprising:
a circuit including:
a first Universal Serial Bus (USB) host controller;
a second USB host controller, and
a USB arbiter to couple the first USB host controller and the second USB host controller to the bus, the USB arbiter to arbitrate between grant request signals from the first USB host controller and the second USB host controller; and
a arbiter to determine when an output of the USB arbiter is granted access to the bus.

22. The system of claim 21, wherein a total data flow between the USB arbiter and the bus exceeds twelve megabits per second.

23. The system of claim 21, wherein a total data flow between the USB arbiter and the bus is approximately a sum of a first data flow between the first USB host controller and the USB arbiter and a second data flow between the second USB host controller and the USB arbiter.

24. The system of claim 21 further comprising:
a bus interface unit which grants requests to the bus based upon request from the USB arbiter.

25. The system of claim 21 wherein the USB arbiter includes a priority solver logic circuit to determine whether the first USB host controller or the second USB host controller had the least recent access to the bus.

26. The system of claim 25 wherein the USB arbiter includes a demultiplexer, a select line of the demultiplexer is coupled to an output of the priority solver, and a plurality of input lines of the demultiplexer configured to receive initiator signals from the first USB host controller and the second USB host controller.

27. The system of claim 25 wherein the USB arbiter uses rotating arbitration to select whether the first USB host controller or the second USB host controller receives access.

28. The system of claim 25 wherein the USB arbiter uses fixed arbitration to select whether the first USB host controller or the second USB host controller receives access.

29. For establishing communications with a bus, a circuit comprising:
a first Universal Serial Bus (USB) host controller;
a second USB host controller;
a USB arbiter to couple the first USB host controller and the second USB host controller to the bus, the USB arbiter including:
a priority solver logic circuit to determine whether the first USB host controller or the second USB host controller had the least recent access to the bus, and
a demultiplexer including a select line coupled to an output line of the priority server logic circuit and a plurality of input lines to receive initiator signals from the first USB host controller and the second USB host controller.

30. A method for transferring data between a plurality of Universal Serial Bus (USB) devices and a bus, comprising:
determining using a priority solver state machine of a USB arbiter whether a first USB host controller or a second USB host controller has priority;
granting access to the bus to one of the first and second USB host controllers which has priority; and
supporting the transfer of the data exceeding twelve megabits per second between the USB arbiter and the bus.

* * * * *